United States Patent
Chattopadhyay et al.

(10) Patent No.: US 10,908,077 B2
(45) Date of Patent: Feb. 2, 2021

(54) IN-SITU DAMAGE DETECTION SYSTEM FOR MECHANOPHORE-EMBEDDED FIBER REINFORCED COMPOSITES

(71) Applicants: Aditi Chattopadhyay, Chandler, AZ (US); Bonsung Koo, Tempe, AZ (US); Lenore Dai, Phoenix, AZ (US); Ryan Gunckel, Tempe, AZ (US); Jack Miller, Rochester, MN (US)

(72) Inventors: Aditi Chattopadhyay, Chandler, AZ (US); Bonsung Koo, Tempe, AZ (US); Lenore Dai, Phoenix, AZ (US); Ryan Gunckel, Tempe, AZ (US); Jack Miller, Rochester, MN (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 16/221,191

(22) Filed: Dec. 14, 2018

(65) Prior Publication Data
US 2019/0187047 A1    Jun. 20, 2019

Related U.S. Application Data

(60) Provisional application No. 62/598,824, filed on Dec. 14, 2017.

(51) Int. Cl.
  *G01N 21/35* (2014.01)
  *G01N 31/22* (2006.01)
  (Continued)

(52) U.S. Cl.
  CPC .............. *G01N 21/35* (2013.01); *C08L 63/00* (2013.01); *G01L 1/248* (2013.01); *G01N 31/22* (2013.01); *G01N 2021/3595* (2013.01)

(58) Field of Classification Search
  CPC .................. G01N 21/35; G01N 31/22; G01N 2021/3595; C08L 63/00; G01L 1/248; G01M 5/0091
  See application file for complete search history.

(56) References Cited

U.S. PATENT DOCUMENTS

| | | |
|---|---|---|
| 2010/0206088 A1 | 8/2010 | Potisek et al. |
| 2013/0274412 A1 | 10/2013 | Hickenboth et al. |
| | (Continued) | |

OTHER PUBLICATIONS

Nofen et al. ("Dimeric anthracene-based mechanophore particles for damage precursor detection in reinforced epoxy matrix composites", Mater. Res. Express 3 (2016) 035701; publication date: Feb. 24, 2016.*

(Continued)

*Primary Examiner* — David P Porta
*Assistant Examiner* — Meenakshi S Sahu
(74) *Attorney, Agent, or Firm* — Michael Best & Friedrich LLP

(57) ABSTRACT

Methods and systems are provided for detecting mechanophore damage in a composite material where the mechanophores are embedded in a matrix of the composite material. A mechanical load is applied to the composite material. A damage precursor signal is generated as a result of the mechanical load and is detected before yield of the mechanophore embedded composite material. Detecting the damage precursor signal may include illuminating the mechanophore embedded composite material with UV light to excite the embedded mechanophores, capturing fluorescent emissions of the embedded mechanophores with a UV camera, and filtering light received at the UV camera based on an emission wavelength of the mechanophores. Alternatively, the damage precursor signal may be detected using spectra from an evanescent wave distorted by the mecha- (Continued)

nophore embedded composite material using an attenuated total reflectance-Fourier transform infrared spectroscopy (ATR-FTIR) system.

12 Claims, 14 Drawing Sheets

(51) Int. Cl.
    *G01L 1/24*     (2006.01)
    *C08L 63/00*     (2006.01)

(56) References Cited

U.S. PATENT DOCUMENTS

| | | | |
|---|---|---|---|
| 2016/0009845 A1* | 1/2016 | Gordon | C08F 293/00 525/94 |
| 2016/0097641 A1 | 4/2016 | Dai et al. | |
| 2016/0168314 A1 | 6/2016 | Wu et al. | |
| 2016/0332121 A1 | 11/2016 | Datta et al. | |

OTHER PUBLICATIONS

Ali et al., "Photoresponsive functionalized vinyl cinnamate polymers: synthesis and characterization", Polymer International, vol. 43, pp. 310-316, 1997.
Bai et al, "Synthesis of a diamine cross-linker containing Diels-Alder adducts to produce self-healing thermosetting epoxy polymer from a widely used epoxy monomer", Polymer Chemistry, vol. 4, pp. 724-730, 2013.
Beiermann et al., "Environmental effects on mechanochemical activation of spiropyran in linear PMMA", Journal of Materials Chemistry, vol. 21, pp. 8443-8447, 2011.
Bekyarova et al., "Multiscale carbon nanotube-carbon fiber reinforcement for advanced epoxy composites", Langmuir, vol. 23, pp. 3970-3974, 2007.
Beyer et al., "Mechanochemistry: The Mechanical Activation of Covalent Bonds", Chemical Reviews, vol. 105, No. 8, pp. 2921-2948, 2005.
Black et al. "Mechanochemically triggered bond formation in solid-state polymers", Journal of Materials Chemistry, vol. 21, pp. 8460-8465, 2011.
Black et al., "From molecular mechanochemistry to stress-responsive materials", Journal of Materials Chemistry, vol. 21, pp. 1655-1663, 2011.
Brantley et al., "Polymer mechanochemistry: the design and study of mechanophores", Polymer International, vol. 62, pp. 2-12, 2013.
Caruso et al., "Mechanically-induced chemical changes in polymeric materials", Chem. Review, vol. 109, pp. 5755-5798, 2009.
Celestine et al., "Fracture-induced activation in mechanophore-linked, rubber toughened PMMA", Polymer, vol. 55, pp. 4164-4171, 2014.
Cho et al, "A flourescent crack sensor based on cyclobutane-containing crosslinked polymers of tricinnamates", Sensors and Actuators, B, vol. 134, pp. 822-825, 2008.
Cho et al., "Photochemical crack healing in cinnamate-based polymers", Journal of Nanoscience and Nanotechnology, vol. 10, pp. 6872-6976, 2010.
Chung et al., "Crack Healing in Polymeric Materials via Photochemical [2+2] Cycloaddition", Chem. Mater., vol. 16, pp. 3982-3984, 2004.
Cintas et al., "Measure the force of sound", Mechanochemistry, vol. 4, pp. 77-2012.
Davis et al., "Force-induced activation of covalent bonds in mechanoresponsive polymeric materials", Nature, vol. 459, pp. 68-72, 2009.
Evtushenko et al., "Determination of Epoxide and Hydroxyl Groups in Epoxide Resins by IR Spectrometry", Journal of Analytical Chemistry, vol. 58, No. 4, pp. 347-350, 2003.

Gillham, "The TBA Torsion Pendulum: a Technique for Characterizing the Cure and Properties of Thermosetting Systems", Polymer International, vol. 44, pp. 262-276, 1997.
Girard-Reydet et al., "Polyetherimide-Modified Epoxy Networks: Influence of Cure Conditions on Morphology and Mechanical Properties", Journal of Applied Polymer Science, vol. 65, pp. 2433-2445, 1997.
Gonjy et al., "Surface modified multi-walled carbon nanotubes in CNT/epoxy-composites", Chemical Physics Letters, vol. 370, pp. 820-824, 2003.
Gossweiler et al., "Mechanochemical activation of covalent bonds in polymers with full and repeatable macroscopic shape recovery", ACS Macro Letters, vol. 3, pp. 216-219, 2014.
Gostl et al., "π-extended anthracenes as sensitive probes for mechanical stress", Chemical Science, vol. 7, pp. 370-375, 2016.
Grdadolnik, "ATR-FTIR spectroscopy: its advantages and limitations", Acta Chim. Slov., vol. 49, pp. 631-642, 2002.
Gunckel et al., "Early damage detection of epoxy via poly(vinyl cinnamate) mechanophore using Fourier transform infrared spectroscopy" Materials Research Express vol. 4, pp. 075014, 2017.
Henbest et al., "Detection of the Epoxide Group by Infrared Spectroscopy", Chemical Society, pp. 1459-1462, 1957.
Hickenboth et al., "Biasing Reaction Pathways with Mechanical Force", Nature, vol. 446, pp. 423-427, 2007.
Ikawa et al., "Flourescence from Poly (N-vinylcarbazole) in Uniaxially Stretched Polymer Films", Journal of Applied Polymer Science, vol. 66, pp. 1569-1573, 1997.
International Search Report and Written Opinion for Application No. PCT/US2017/067746 dated Apr. 16, 2018 (11 pages).
James et al., "Mechanonchemistry: opportunities for new and cleaner synthesis", Chem. Soc. Rev., vol. 41, pp. 413-447, 2012.
Jensen et al., "Adhesive Properties of Cured Phenylethynyl-Terminated Imide Oligomers", J. Adhesion, vol. 54, pp. 57-66, 1995.
Jiang et al., "Mechanoresponsive PS-PnBA-PS triblock copolymers via covalently embedding mechanophore", ACS Macro Letters, vol. 2, pp. 705-709, 2013.
Johns et al., "Photo Retro-Diels-Alder Reactions", Journal of Physical Chemistry A, vol. 115, pp. 8093-8099, 2011.
Kaupp, "Mechanochemistry: the varied applications of mechanical bond-breaking", CrystEngComm, vol. 11, pp. 38-403, 2009.
Kazarin et al., "ATR-FTIR spectroscopic imaging: recent advances and applications to biological systems", Analyst, vol. 138, pp. 1940-1951, 2013.
Kingsbury et al., "Shear activation of mechanophore-crosslinked polymers", Journal of Materials Chemistry, vol. 21, pp. 8381-8388, 2011.
Koo et al. "Molecular dynamics study for experimental design guideline of dimeric anthracene-based mechanophore in the thermoset polymer matrix", Proceedings of the American Society for Composites—31st Technical Conference, DEStech Publications Inc, 2016.
Koo et al., "Atomistic modeling framework for a cyclobutane-based mechanophore-embedded nanocomposite for damage precursor detection", Computational Materials Science, vol. 120, pp. 135-141, 2016.
Koo et al., "Multiscale Modeling and Characterization of Stress-sensitive Mechanophore-embedded Nanocomposites", Structural Health Monitoring 2015: System Reliability for Verification and Implementation, pp. 2227-2234, 2015.
Kryger et al., "Structure-Mechanochemical Activity Relationships for Cyclobutane Machanophores", J. Am. Chem. Soc., vol. 133, pp. 18992-18998, 2011.
Kryger, "Masked Cyanoacrylates Unveiled by Mechanical Force", Journal Am. Chem. Soc., vol. 132, pp. 4558-4559, 2010.
Kulkarni et al., "Ballistic helmets—Their design, materials, and performance against traumatic brain injury", Composite Structures, vol. 101, pp. 313-331, 2013.
Larsen et al., "'Flex-activated' mechanophores: using polymer mechanochemistry to direct bond bending activation", Journal of the American Chemical Society, vol. 135, pp. 8189-8192, 2013.

(56) References Cited

OTHER PUBLICATIONS

Li et al., "Polymer Mechanochemistry: From Destructive to Productive", Accounts of Chemical Research, vol. 48, pp. 2181-2190, 2015.
Li, et al. "Effect of Polymer Grafting Density on Mechanophore Activation at Heterointerfaces" ACS Macro Letters, vol. 5, No. 7, pp. 819-822, 2016.
Liu et al., "Crosslinked Epoxy Materials Exhibiting Thermal Remendability and Removability from Multifunctional Maleimide and Furan Compounds", Journal of Polymer Science, vol. 44, pp. 905-913, 2006.
Liu et al., "Using high-temperature mechanochemistry treatment to modify iron oxide and improve the corrosion performance of epoxy coating—I. High temperature ball mililng treatment", Corrosion Science, vol. 90, pp. 451-462, 2015.
Montazeri et al., "Mechanical properties of multi-walled carbon nanotube/ epoxy composites", Materials and Design, vol. 31, pp. 4202-4208, 2010.
Nakamura et al., "Photodimerization of cinnamic acids controlled by molecular assemblies of surfactant amine N-oxides", Journal of Chemical Society Perkin Trans., vol. 2, pp. 2751-2755, 1997.
Nielsen, "Crosslinking-effect on Physical Properties of Polymers", Journal of Macromolecular Science , Review Macromol. Chem., C3, 69-103, 1969.
Nofen et al., "Dimeric anthracene-based mechanophore particles for damage precursor detection in reinforced epoxy matrix composites", Materials Research Express, vol. 3, 035701, 2016.
Nofen et al., "Stress-sensing thermoset polymer network via grafted cinnamoyl/cyclobutane mechanophore units in epoxy", Polymer Chemistry, vol. 7, pp. 7249-7259, 2016.
Nofen, "Stress Responsive Nano- and Microcomposites Featuring Mechanophore Units" Dissertation submission to Arizona State University, Aug. 2016, 273 pages.
Olmos et al., "A fluorescence method to estimate the distribution of stresses in polymer materials", Journal of Materials Processing Technology, vol. 143, pp. 495-500, 2003.
Oya et al., "Photoinduced mendable network polymer from poly(butylene adipate) end-functionalized with cinnamoyl groups", Polymer Journal, vol. 44, pp. 724-729, 2012.
Peterson, et al., "Room-Temperature Healing of a Thermosetting Polymer Network Using the Diels-Alder Reaction", ACS Applied Materials & Interfaces, vol. 2, No. 4, pp. 1141-1149, 2010.
Potisek et al., "Mechanophore-Linked Addition Polymers", Journal Am. Chem. Society, vol. 129, pp. 13808-13809, 2007.
Rafferty et al., "FT-IR imaging of patterned photocrosslinkable poly(vinyl cinnamate)", Applied Spectroscopy, vol. 56, pp. 1549-1551, 2002.
Rai et al., "Multiscale damage analysis of carbon nanotube nanocomposite using a continuum damage mechanics approach", Journal of Composite Materials, vol. 51, No. 6, pp. 847-858, 2016.
Roberts et al.,"Mechanochromic systems for the detection of stress, strain and deformation in polymeric materials", Journal of Materials Chemistry, vol. 21, pp. 8256-8268, 2011.
Rojac et al., "Using Infrared Spectroscopy to Identify New Amorphous Phases—A Case Study of Carbonato Complex Formed by Mechanochemical Processing" InTech, 2012, pp. 13-42, 2012.
Silberstein et al., "Modeling mechanophore activation within a crosslinked glassy matrix", Journal of Applied Physics, vol. 114, 023504, 2013.
Song et al., "Fluorescence sensing of microcracks based on cycloreversion of a dimeric anthracene moiety", Journal of Materials Chemistry, vol. 22, pp. 1380-1386, 2012.
Sottos, "Flex, release and repeat", Nature Chemistry, vol. 6, pp. 381-383, 2014.
Takagi, et al., "Organized Photodimerization of Unsaturated Carboxylates. Selectivity Control by Normal and Reversed Micelles", Journal Chemical Society Perkin Trans., vol. 2, pp. 1003-1009, 1994.
Tasdelen, "Diels-Alder 'click' reactions: recent applications in polymer and material science", Polymer Chemistry, vol. 2, pp. 2133-2145, 2011.
Vaidya et al., "Processing of fibre reinforced thermoplastic composites", International Material Review, vol. 53, No. 4, pp. 185-218, 2008.
Wang et al., "Inducing and quantifying forbidden reactivity with single molecule polymer mechanochemistry", Nature Chemistry, vol. 7, pp. 323-327, 2015.
Wang et al., "Mechanochemical strengthening of a multi-mechanophore benzocyclobutene polymer", ACS Macro Letters, vol. 4, pp. 834-837, 2015.
Wang et al., "The effects of CNT alignment on electrical conductivity and mechanical properties of SWNT/epoxy nanocomposites", Composites Science and Technology, vol. 68, pp. 1644-1648, 2008.
Yoshie et al, "A thermally-stable self mending polymer networked by Diels-Alder cycloaddition", Polymer, vol. 52, pp. 6074-6079, 2011.
Zako et al., "Intelligent Material Systems Using Epoxy Particles to Repair Microcracks and Delamination Damage in GFRP", Journal of Intelligent Material Systems and Structures, vol. 10, pp. 836-841, 1999.
Zhang, "Multiscale Modeling of Heterogeneous Material Systems", Arizona State University, PhD Thesis, 190 pages, 2014.
Zheng et al., "A novel approach to recycling of glass fibers from nonmetal materials of waste printed circuit boards", Journal of Hazardous Materials, vol. 170, pp. 978-982, 2009.
Zou et al. "Self Sensing of Matrix Damage using Mechanophore-based Smart Polymer in Fiber Reinforced Composites", Journal of Multifunctional Composites, vol. 2, No. 4, pp. 207-215, 2014.
Zou et al., "Early damage detection in epoxy matrix using cyclobutane-based polymers", Smart Materials and Structures, vol. 23, 095038, 2014.
Unpublished U.S. Appl. No. 16/390,969, filed Apr. 22, 2019.
United States Patent Office Action for U.S. Appl. No. 16/349,221 dated Aug. 12, 2020 (10 pages.).
Kim et al., "Mechanoactivation of Spiropyran Covalently Linked PMMA: Effect of Temperature, Strain Rate, and Deformation Mode," Macromolecules, vol. 48, pp. 1335-1342, 2015.

* cited by examiner

IN-SITU DAMAGE DETECTION SYSTEM FOR MECHANOPHORE-EMBEDDED FIBER REINFORCED COMPOSITES

CROSS REFERENCE TO RELATED APPLICATIONS

This application claims the benefit of U.S. Provisional Patent Application No. 62/598,824, filed on Dec. 14, 2017, which is incorporated herein by reference in its entirety.

TECHNICAL FIELD

The present disclosure relates to damage detection systems of mechanophores. More particularly, the present disclosure relates to real-time damage detection systems including mechanophore-embedded fiber reinforced composites.

BACKGROUND

Fluorescent microscopy is currently used to observe fluorescence emitted from mechanophore embedded polymers after damage initiates in the polymers. However, this is not an in-situ damage detection method. The development of a new system is required to detect damage initiation and progression during mechanical loading tests.

SUMMARY

The present disclosure relates to a real-time damage detection system using mechanophores. In one embodiment, fiber reinforced composites with mechanophore embedded polymers are employed. The system may comprise, for example, an ultra-violet (UV) camera, UV lamp, a band-pass filter, and load-frame. Certain embodiments of the system are capable of capturing damage initiation and tracking damage progression in composites subjected to mechanical loading. Activated mechanophores embedded in a composite indicate the presence of damage, in real-time, in the form of UV fluorescence that can be captured using the UV camera. The mechanophore embedded composite samples are subjected to mechanical loading using a load-frame. When damage is initiated, and the activated mechanophores are exposed to UV light, the UV excited fluorescence is captured using a UV camera.

In some embodiments, a method for detecting mechanophore damage in a composite material comprises embedding mechanophores in the composite material. The mechanophores are embedded in a matrix of the composite material. A mechanical load is applied to the mechanophore embedded composite material. A damage precursor signal is detected. The damage precursor signal is generated as a result of the application of the mechanical load to the mechanophore embedded composite material. The damage precursor signal is detected before yield of the mechanophore embedded composite material. In some embodiments, detecting the damage precursor signal may include (1) illuminating the mechanophore embedded composite material with UV light to excite the mechanophores that are embedded in the composite material, (2) capturing fluorescent emissions of the UV light excited mechanophores embedded in the composite material with a UV camera, and (3) filtering light received at the UV camera based on an emission wavelength of the mechanophores. In some embodiments, detecting the damage precursor signal may include detecting spectra from an evanescent wave distorted by the mechanophore embedded composite material using an attenuated total reflectance-Fourier transform infrared spectroscopy (ATR-FTIR) system.

In some embodiments, a system for detecting mechanophore damage in a composite material comprises a mechanophore embedded composite material where the mechanophores are embedded in a matrix of the composite material. The system also includes a load frame and a light detecting device. The load frame is configured to apply a mechanical load to the mechanophore embedded composite material. The light detecting device is configured to detect a damage precursor signal that is generated as a result of the application of the mechanical load to the mechanophore embedded composite material. The damage precursor signal is detected before yield of the mechanophore embedded composite material. In some embodiments, the light detecting device may be an ultra violet (UV) camera and a filter that detects the damage precursor signal by (1) illuminating the mechanophore embedded composite material with UV light to excite the mechanophores that are embedded in the composite material, and (2) capture fluorescent emissions of the UV light excited mechanophores with the UV camera, and (3) filter light received at the UV camera based on an emission wavelength of the mechanophores. In some embodiments, the light detecting device is an attenuated total reflectance-Fourier transform infrared spectroscopy (ATR-FTIR) system that detects the damage precursor signal by detecting spectra from an evanescent wave distorted by the mechanophore embedded composite material using the ATR-FTIR system.

In some embodiments, a system for detecting damage in real-time in a mechanophore comprises an ultra-violet illumination source, an ultra-violet camera, and a band-pass filter. The ultra-violet illumination source is directed to a mechanophore sample, where the ultra-violet illumination activates the mechanophore sample. The ultra-violet camera is also directed to the mechanophore sample. The band-pass filter is fitted on the ultra-violet camera and is configured to pass fluorescence emitted from the activated mechanophore sample to the ultra-violet camera.

In some embodiments, a system is provided for detecting damage in real-time in a mechanophore. The system includes an ultra-violet illumination source directed to a mechanophore sample, an ultra-violet camera directed to the mechanophore sample, and a band-pass filter fitted on the ultra-violet camera. The band-pass filter is configured to pass fluorescence emitted from the activated mechanophore sample to the ultra-violet camera.

In some embodiments, a method is provided for detecting mechanophore damage in polymer reinforced composite material. The method includes embedding mechanophores in a thermoset polymer matrix to form fiber reinforced composite material. With the application of mechanical load, a mechanophore damage signal is generated before material yield (or failure). As load increases and damage in the composite samples initiate and progress, the intensity of the signal increases. The activation of the mechanophores before yield shows that damage precursor in polymer matrix composites under mechanical loading is captured.

In some embodiments, an experimental system for detecting damage in fiber reinforced composites is provided. The matrix phase of the fiber reinforced composite samples contains self-sensing mechanophores and epoxy-based thermoset polymer. The experimental system includes a mechanical load-frame, which is configured to apply mechanical loads to the composites samples. The UV camera is configured to detect a mechanophore damage signal that is generated as a result of the application of the mechanical load to the composite samples. Damage precursor in the mechanophore embedded fiber reinforced polymer composite samples is detected before material yield.

Other aspects of the disclosure will become apparent by consideration of the detailed description and accompanying drawings.

DETAILED DESCRIPTION

Figure 1:
FIG. 1 is an image showing a visual change that occurred when a mechanophore was damaged, according to some embodiments.

Before any embodiments of the disclosure are explained in detail, it is to be understood that the disclosure is not limited in its application to the details of construction and the arrangement of components outlined in the following description or illustrated in the following drawings. The disclosure is capable of other embodiments and of being practiced or of being carried out in various ways.

Mechanophores are force-responsive moieties which undergo a chemical reaction or response to an externally applied tensile or compressive force. They have been incorporated in thermoplastics, crosslinked polymers, and block copolymers and have been used to study mechanical responsiveness under stress at the molecular level by detecting chain breakage within these polymer networks. Mechanophores can be incorporated into the backbone of linear polymers to provide signal detection in the presence of mechanical loads. Additional information regarding mechanophores and mechanophore embedded composites can be found in U.S. Provisional Patent Application No. 62/436,950, which was filed on Dec. 20, 2016, and in International Patent Application No. PCT/US2017/067746, which was filed on Dec. 20, 2017, both of which are incorporated herein by reference in their entireties.

For example, a previous study examined the process in which colorless spiropyran underwent a ring-opening reaction when a tensile load was applied to form a red-colored merocyanine. However, this color-change, as a form of a signal for damage detection, was not generated until after significant and permanent mechanical damage occurred. Focusing more on the ability to detect damage or potential failure as early as possible instead of detection after damage occurs in a material, would allow for significant progress in fields such as material and mechanical characterization.

Two moieties, cinnamoyl and anthracene, can dimerize using ultraviolet light to form a force-sensitive and highly strained bond that can be severed by the external application of a mechanical load. When severed, these bonds become fluorescent with an emission at about 500 nm to about 550 nm and at about 365 nm to about 415 nm. Also, the fluorescent response intensity within the region of about 6% to about 15% strain was discovered to be linear with respect to the applied stress on the sample.

Cinnamoyl groups can be incorporated into an epoxy thermoset, for example, by mixing 1, 1, 1-tris(cinnamoyloxymethyl) ethane (TCE). Also, the anthracene moiety can be applied using dimerized anthracene carboxylic acid (Di-AC) as a mechanophore particle distributed throughout an epoxy matrix. Poly(vinyl cinnamate) (PVCi) is a vinyl polymer (each monomeric unit containing a cinnamoyl moiety) that can be UV irradiated to create a crosslinked matrix. PVCi can be mixed with standard epoxy and then irradiated to readily form force-sensitive cyclobutane bonds as a cross-linker for PVCi.

However, there are several limitations with using fluorescence as a detection method. First, samples must be transparent to properly examine for fluorescence. Composites utilizing carbon-based reinforcement methods such as carbon nanotubes (CNTs), carbon nanofibers (CNFs), and carbon black are opaque and therefore are incapable of generating a sufficient signal using current fluorescent detection methods. In addition, the fluorescent signal generated from opaque samples shows only the mechanophore activation at the surface of the material. This signal may not be strong enough to accurately characterize mechanophore response using fluorescence microscopy.

Herein is disclosed, among other things, that signals of samples incorporated with mechanophores can be detected using attenuated total reflectance-Fourier transform infrared spectroscopy (ATR-FTIR). ATR-FTIR is a type of spectroscopy where infrared light is introduced into a prism at an angle exceeding the critical angle for internal reflection. This produces an evanescent wave at the reflecting surface (a surface which is transparent to infrared, such as thallium bromide) on which the sample is supported. The distortion of the evanescent wave by the sample is measured, producing a spectrum which is then subject to a Fourier transform. ATR-FTIR is advantageous over standard transmittance FTIR because it allows for surface characterization of materials and is capable of measuring samples with higher density and little to no transparency. The signal generated from molecular scission of strained bonds can be compared to a reference peak of the signal from unstrained bonds. The difference in the signals can be utilized to normalize the data, and characterize and detect damage of the dimerized cinnamoyl and anthracene moiety samples without the need for fluorescence. In addition, ATR-FTIR may also improve current detection capabilities by approximately 2% strain. Fluorescent imaging techniques detect damage at approximately 6% strain while ATR-FTIR methods detect damage at approximately 4% strain for cinnamoyl based mechanophores.

With employment of ATR-FTIR, mechanophore signal detection capabilities allow for increased sensitivity and detection at earlier or lower levels of strains. In certain embodiments, the cyclobutane bonds are embedded within the epoxy matrix to generate a signal before the yield strain of the bulk epoxy composite. This form of precursor detection occurs within the elastic region of the composite and before the material reaches its yield point. Therefore, it is important to note that the damage does not occur to the bulk matrix, but rather to the cyclobutane bonds present within the crosslinked PVCi cinnamoyl groups.

Also disclosed herein, among other things, is an experimental framework for in-situ damage detection in fiber reinforced composites, using stress-sensitive mechanophores.

Also disclosed herein, among other things, is a real-time damage detection system for fiber reinforced composites using Di-AC based mechanophores. The system may comprise, for example, a UV camera, UV lamp, band-pass filter, and load-frame. Certain embodiments of the system are capable of capturing damage initiation, and tracking damage progression in composite samples embedded with mechanophores when the samples are subject to mechanical loading. The initiation of damage occurs when there is damage in a localized area of the composite sample, or when a constituent(s) of the sample is damaged while other constituents remain intact. For example, damage may initiate when mechanophores embedded in a sample are damaged. This initiation of damage occurs prior to yield of the composite sample (such as, overall damage occurring to the sample as a whole). As damage is initiated, the activated mechanophores in the sample emit fluorescent light when exposed to UV light, and the UV excited fluorescence is captured using a UV camera.

Using an in-situ damage detection system, local damage initiation is detected with a high degree of accuracy. The disclosed system can be converted into a handheld device by integrating the UV lamp and UV camera. It allows for initial damage detection in fiber reinforced composites while mechanical loads are applied to the composite samples. It is a real time in situ damage inspection system.

Previous damage detection methods via mechanophore fluorescence utilize a fluorescent microscope to detect damage after it has already been applied. Samples were damaged to certain strains and examined under a fluorescent microscope to observe how this fluorescent response increases. This method is limited with respect to the number of data points. Only general trends can be observed. However, the disclosed system can, for example, observe damage detection in-situ and observe the fluorescent response simultaneously. Such technology has never been combined with force responsive mechanophore embedded fiber reinforced composites.

The disclosed systems and methods may be useful to detect damage in a range of applications (e.g., Department of Defense (DoD), civil infrastructure, and automotive) where composites are used. The disclosed systems and methods may also directly impact the advancement of structural health monitoring and non-destructive evaluation (NDE) systems.

FIG. 1 depicts a visual change that occurred when a mechanophore was damaged. Mechanophores undergo a chemical reaction when subjected to a mechanical load. As shown in FIG. 1, visual change occurs (i.e., a color change or fluorescence emission) when an adequate load is applied to a material comprising mechanophores. Thus, damage or fatigue of a material can be assessed in a non-destructive method based on the visual changes of embedded mechanophores. It is preferable to minimize effects on the host material properties while achieving the damage-sensing capability. Early damage detection is an invaluable asset to prevent catastrophic failure in the host material.

Figure 2A:
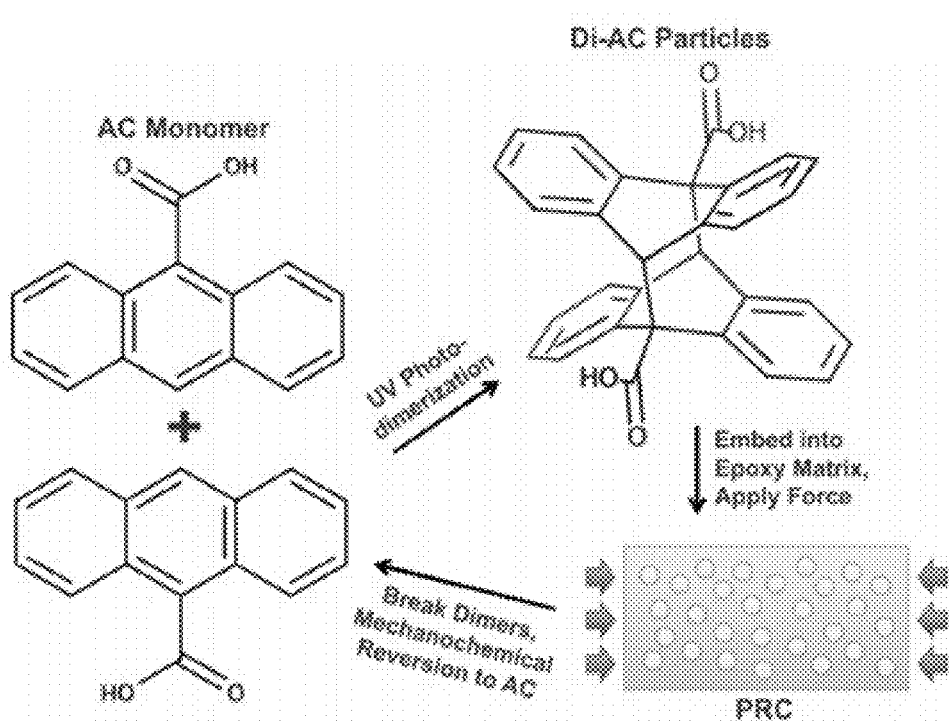
FIGS. 2A-2C illustrate the synthesis of dimerized anthracene (Di-AC), an ultra violet (UV) fluorescence image of a sample without damage, and a UV image of a damaged sample, according to some embodiments.
Figure 2B:
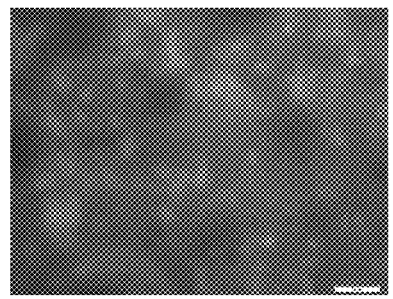
Figure 2C:
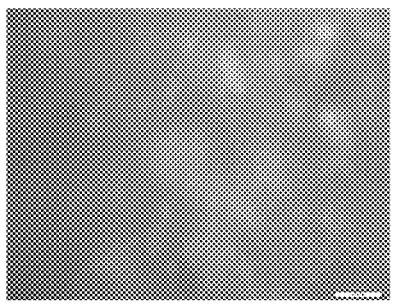

FIGS. 2A-2C illustrate the synthesis of Di-AC, a UV fluorescence image of a healthy sample (i.e., an undamaged sample), and a UV image of a damaged sample. Referring to FIG. 2A, an overview of an anthracene dimerization process shows the conversion of the anthracene (AC) monomer to Di-AC particles by application of UV light. Subsequently, the Di-AC particles are embedded into an epoxy matrix to form a particle reinforced composite (PRC). Upon application of a load to the PRC, the embedded Di-AC particles revert to the AC monomeric form to enhance an overall fluorescence of the PRC for stress sensing. FIG. 2B is a UV fluorescence image of a healthy sample of a PRC. FIG. 3C is a UV image of a damaged sample of a PRC.

The use of Di-AC in a PRC has at least three advantages over other mechanophores, including minimal impact on host material properties; a linear relationship between applied load and fluorescence; and damage precursor detection. The excitation wavelength is about 340 nm-380 nm. The emission wavelength is about 435 nm-485 nm. Although Di-AC is preferred in some embodiments, other suitable mechanophores are contemplated herein. For example, cyclobutane-based mechanophores which are synthesized using TCE or PVCi are other suitable mechanophores. TCE and PVCi are also suitable mechanophores and are described above.

Figure 3A:
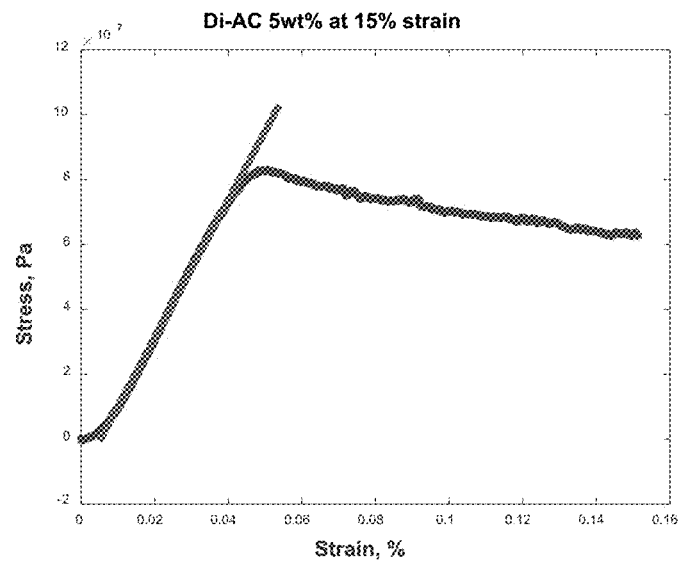
FIGS. 3A-3B graphically illustrate a stress-strain curve for application of stress to Di-AC samples and a fluorescent response, according to some embodiments.
Figure 3B:
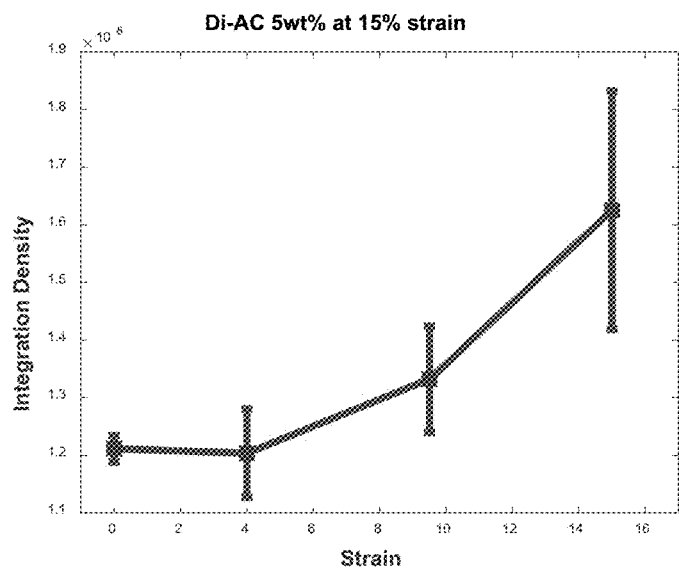

FIGS. 3A-3B graphically illustrate a stress-strain curve of Di-AC samples and a fluorescent response. Compression tests were conducted on Di-AC samples at 4%, 9.5%, and 15% strain. FIGS. 3A-3C illustrate the results for 15% strain. The measured mechanical properties were similar to earlier measurements. The Young's modulus was 2.12 GPa. The yield strength was 83.04 MPa. The mechanophore activation was observed at about 4%-6% strain.

Various device designs may be utilized to detect damage initiation in composite samples. In certain embodiments, a fluorescent microscope is combined with a load frame for accurate analysis of samples during static and fatigue tests. Data such as stress, strain, and intensity may be collected and displayed in real-time, which allows for increased accuracy, real-time damage detection, and modularity for future applications with different mechanophores.

Figure 4:
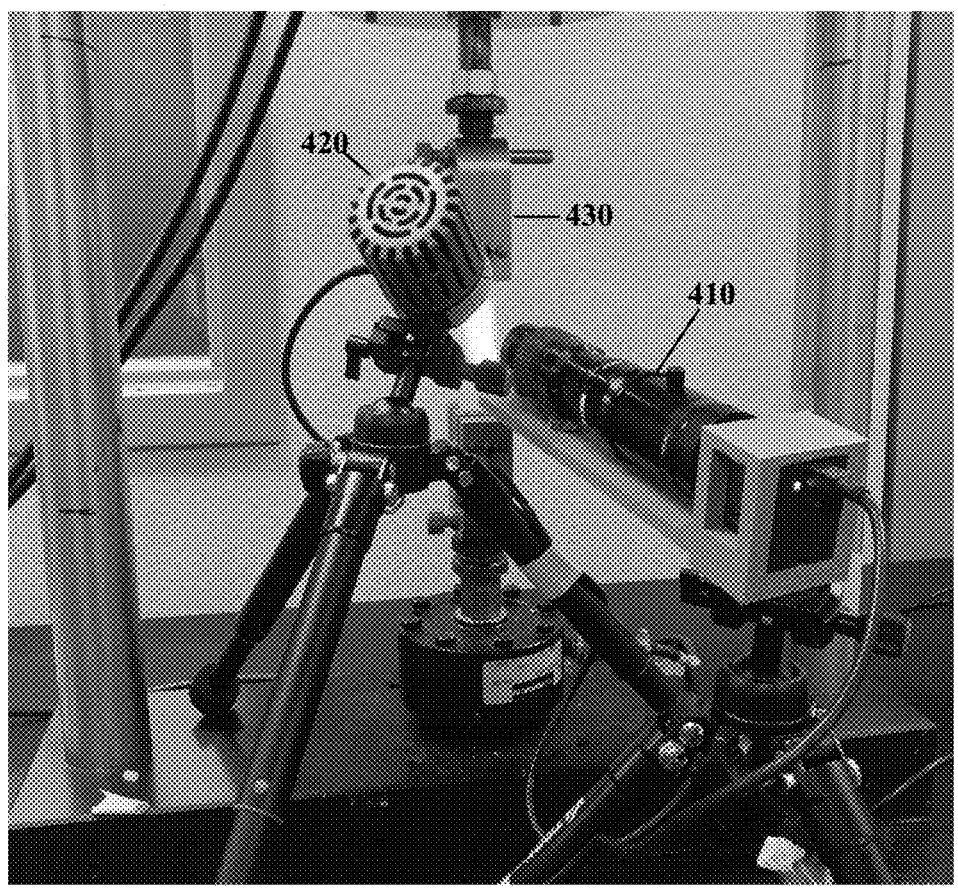
FIG. 4 shows a system for detecting damage in a mechanophore in real-time, according to some embodiments.

FIG. 4 shows a system for detecting damage in a mechanophore in real-time, according to some embodiments. FIG. 4 includes a system with a UV camera 410, a UV source 420, and a load frame 430.

To detect in-situ damage, samples may be measured in a dark room to minimize ambient light interference. In some embodiments, the UV camera 430 may include a Thorlabs DCU223M UV camera with filters and zoom lens, although other camera setups are possible. In some embodiments, a UV source 420 may include a Thorlabs M365LP1 UV source (365 nm) with driver and power supply. Also, in some embodiments, a load frame 430 may include a Test Resources 800L that can be used for static or fatigue tests.

Figure 5:
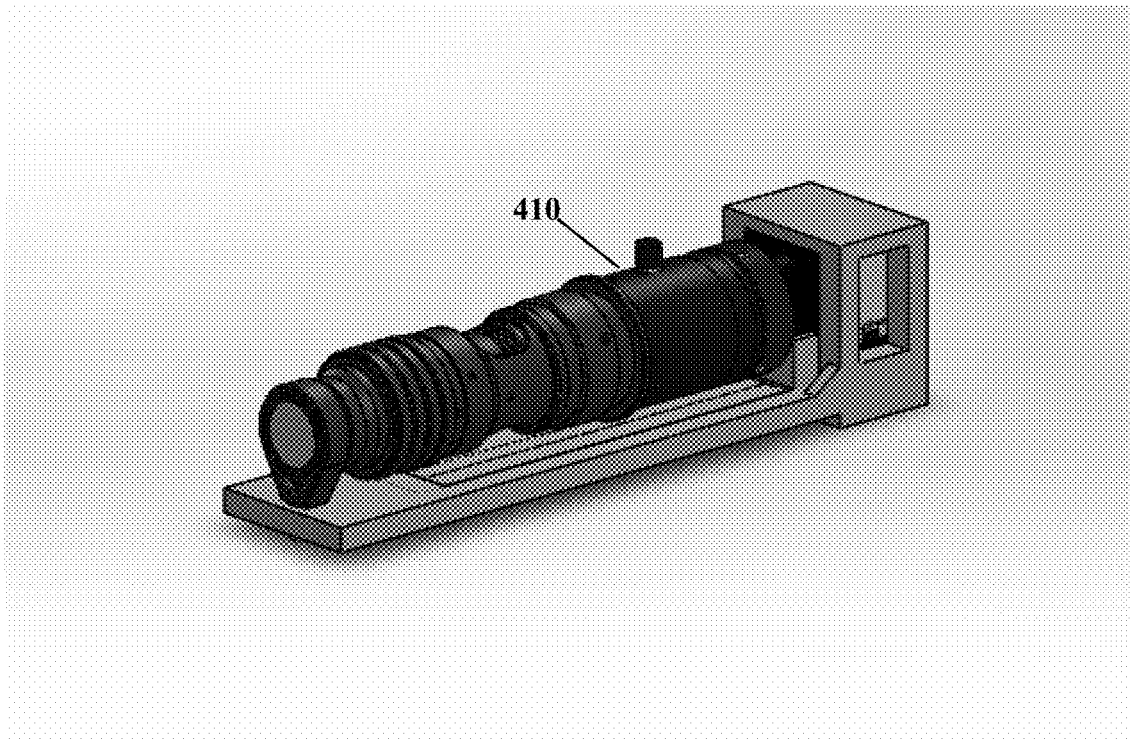
FIG. 5 illustrates a UV camera suitable to use with the system shown in FIG. 4, according to some embodiments.

FIG. 5 illustrates a UV camera suitable to use with the system shown in FIG. 4. In one example, a UV camera 410 setup may include a Thorlabs DCU223M monochrome UV camera with 6.5 times zoom lens system, which can focus on select areas. A filter mount with filters may also be used, such as a 450 nm±40 bandpass, a 500 nm±40 bandpass, a 400 nm long pass, and combinations thereof. Some embodiments include a 3D printed mount, which allows for more consistent placement. Other embodiments could include various other filters of different wavelengths. In addition, the system may include a display connected to the UV camera 410 to output data detected by the UV camera 410.

Figure 6A:
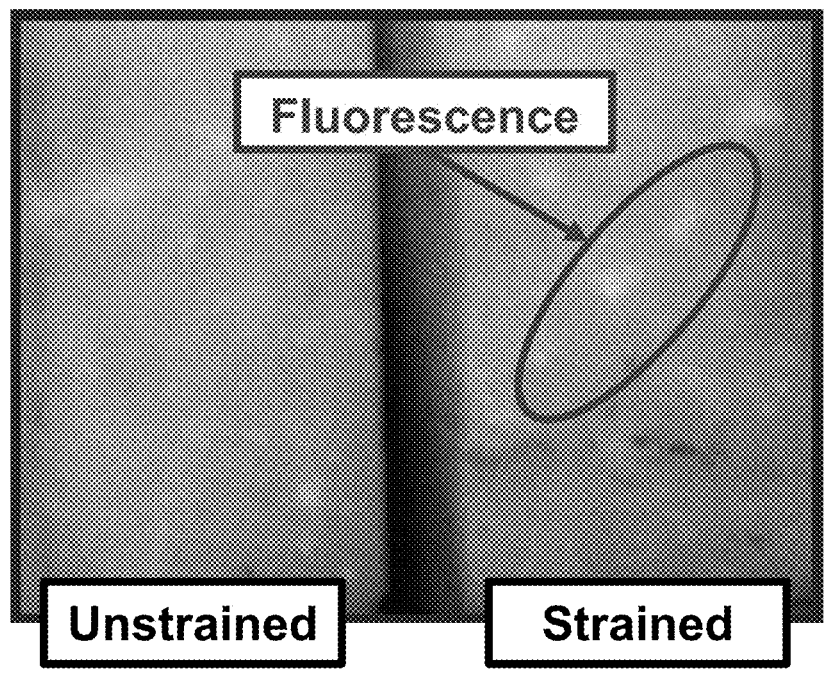
FIGS. 6A-6B are images of preliminary image data using the system shown in FIG. 4, which demonstrate that the system can detect fluorescence when a mechanophore is strained, according to some embodiments.
Figure 6B:
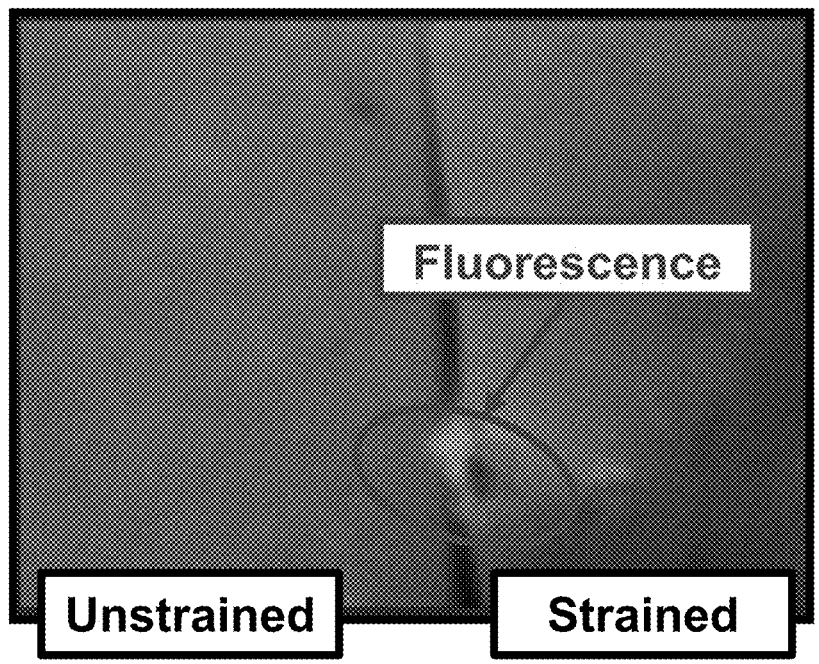

FIGS. 6A-6B include preliminary image data obtained using the system shown in FIG. 4, which demonstrate that the system can detect fluorescence when a mechanophore is strained. In one embodiment, for example, the UV camera 410 detected mechanophores in previously damaged epoxy samples. When damaged, five weight percent (wt %) samples showed a marked increase in fluorescence intensity compared to undamaged samples. In certain embodiments, intensity changes are detected in real-time. Signal noise may limit the accuracy of intensity measurements slightly during fatigue testing, although in some embodiments signal noise may not be a limiting factor.

Figure 7A:
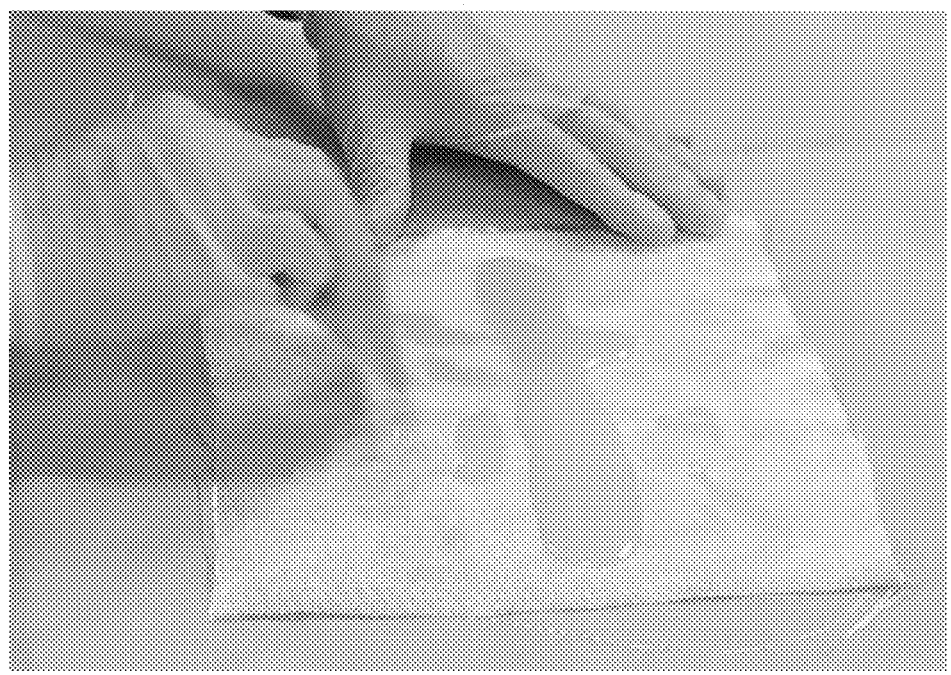
FIGS. 7A-7C illustrate the preparation of glass fiber Di-AC composites, according to some embodiments.
Figure 7B:
Figure 7C:
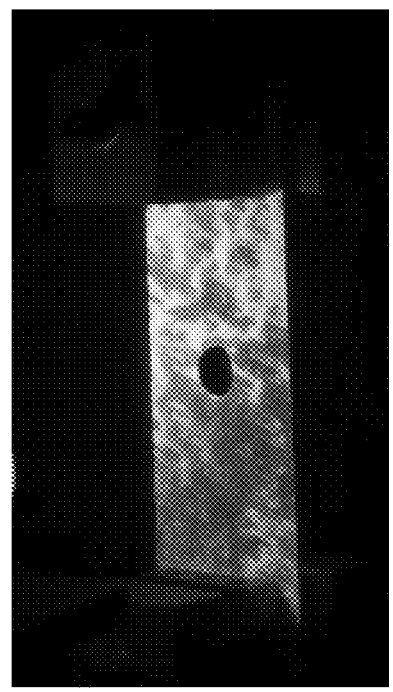

FIGS. 7A-7C illustrate an example of the preparation of glass fiber Di-AC composites. To create a sample of a glass fiber Di-AC composite, Di-AC can be thoroughly mixed to create a 5 wt % epoxy mixture and applied to the glass fiber. See FIG. 7A. Any mechanically induced activation of the mechanophores due to the fabrication was reversed by illumination with UV light before testing. See FIGS. 7B-7C.

Figure 8:
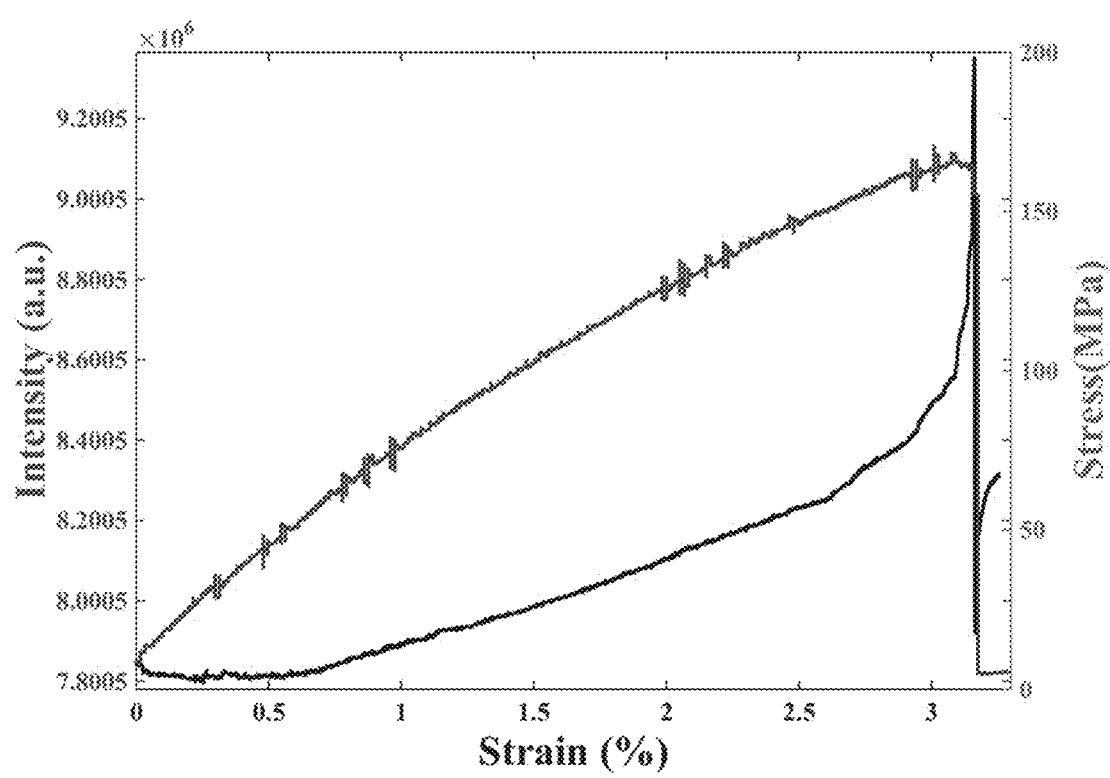
FIG. 8 graphically illustrates the detection of damage of mechanophores in a glass fiber Di-AC sample, in real-time, according to some embodiments.

FIG. 8 graphically illustrates detection of damage of mechanophores in a glass fiber Di-AC sample, in real-time. In one embodiment, real-time static load tests showed promising results for detecting damage of mechanophores in real-time. After a glass fiber Di-AC composite sample underwent 0.5% strain, intensity and stress linearly increased until the composite sample failed. Importantly, the mechanophores were activated and detected before composite yield and failure.

In one embodiment, a UV lamp (365 nm) from Thorlab was used to match the excitation wavelength of a mechanophore embedded composite (about 340 nm to about 380 nm). The emission wavelength of the mechanophore embedded composite was about 435 nm to about 485 nm. To capture the correct wavelengths of only emission by mechanophores without interference, a bandpass filter of 450 nm±40 was used. Since the camera from Thorlabs can capture a wide range of wavelengths from about 300 nm to about 600 nm, the band pass filter can selectively capture UV emissions from the embedded mechanophores. For the load frame, a TestResourse 800L was used, which is a general load frame that can perform static and fatigue loading tests. The load-frame was used to subject the mechanophore embedded composite to mechanical loading. When damage initiates, the material fluoresces under UV light exposure and is captured using the UV camera.

Figure 14:
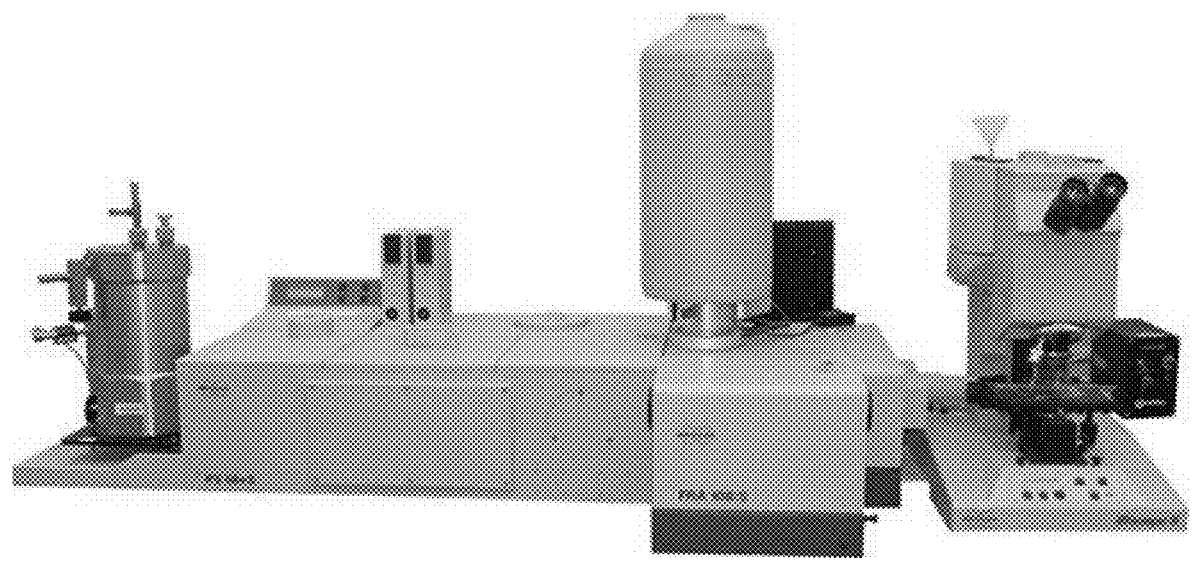
FIG. 14 illustrates an attenuated total reflectance-Fourier transform infrared spectroscopy (ATR-FTIR) system for measuring molecular structure changes in samples incorporated with mechanophores, according to some embodiments.

In another embodiment, ATR-FTIR offers the ability to measure a material's chemical make-up at the surface and examine the activation of a cyclobutane bond within a cinnamoyl group of a mechanophore, regardless of sample transparency. In certain embodiments, samples include 10 wt % PVCi as the active mechanophore in an epoxy thermoset, as well as samples with an additional 0.5% by weight of carbon nanotubes (CNT) to create a completely opaque composite. Both samples were capable of sensing at 4% strain, which is a marked improvement over the prior art (e.g., sensing at 6% strain using UV-fluorescent imaging). Among other things, the sensing system disclosed herein provides a simpler, faster, and more sensitive method for, for example, detecting cyclobutane mechanophore damage over current fluorescence detection methods. An ATR-FTIR system for measuring the chemical make-up at the surface and examining activation of the bond within a mechanophore is shown in FIG. 14 and described below.

It should be noted that the following described embodiments are only presented by way of example and should not be construed as limiting the disclosed concept to any particular physical configuration.

Mechanophore embedded epoxy matrix samples were prepared by first dissolving 0.6 g of poly(vinyl cinnamate) (average $M_n$ 40 000, Sigma Aldrich) and 4.25 g of epoxy resin (diglycidyl ether of bisphenol F, military grade, FS-A23) with 5 ml of dichloromethane (99.8%, Sigma Aldrich). For completely black samples, multi-walled carbon nanotubes (>90%, industrial grade, OD: 10-30 nm, US Research Nanomaterials, Inc.) were added during this step with a loading of 0.5 wt %. The solution was then sonicated at 21% amplitude for 20 s to ensure that the sample was completely dissolved and adequately dispersed. The dichloromethane was then removed through rotary evaporation at 40° C. for 30 min. Next, 1.15 g of hardener (diethylenetriamine, military grade, FS-B412) was added after rotary evaporation to make 6 g total of the sample. The sample was then impeller mixed for 5-10 min at 200 rpm to ensure that the hardener was evenly mixed with the resin and poly(vinyl cinnamate) (PVCi). Immediately after mixing, the sample was poured into 8×3×4 mm rectangular molds, irradiated for 4 h with a 302 nm UV lamp, and left overnight to cure at room temperature.

The samples were compressed to varying levels of strain in order to activate the embedded mechanophore in the epoxy network and to test at what strain level the mechanophore activation would be seen on the FTIR. Molecular scission of the cyclobutane formed after UV irradiation could be monitored. After applying mechanical loads, the intensity of the wavenumber associated with the conjugated double bond in PVCi was hypothesized to increase. By examining the relative intensity of this bond with respect to applied bulk strain, it was determined that a signal should be detectable. Assuming PVCi is evenly dispersed throughout the epoxy and is at high enough loading, there should be enough cyclobutane bonds at the surface of the material to generate ample signal. A Test Resources 800L Compression Test System was used to test samples at 2%, 4%, 6%, and 15% strain at a strain rate of 1 mm min$^{-1}$. ATR-FTIR spectra were taken with a Bruker IFS 66V/S FTIR, wide-band Mercury Cadmium Telluride (MCT) detector, KBr mid-IR beamsplitter, and a Pike diamond-ATR module from 4000 cm$^{-1}$ to 400 cm$^{-1}$. See FIG. 14 for an example of an ATR-FTIR system.

Development and validation of a new ATR-FTIR detection method were necessary before evaluating a full range of mechanophore loading and varied strain experiments. Due to the nature of FTIR spectra, weight loading of poly(vinyl cinnamate) (PVCi) embedded into the epoxy network as well as the morphology of the sample surface both are important factors in determining the viability of early damage detection. When measuring spectra of a solid sample, it was important that the sample surface maintain as much contact with the ATR diamond as possible to ensure a strong signal. However, because of the nature of the sample surface, especially at high strains, signal strength varied due to surface deformation and crack formation. To counteract this, a neutral reference peak was chosen at about 1575 $cm^{-1}$, corresponding to an aromatic carbon-carbon double bond, to normalize each spectrum and provide a direct comparison. For preliminary data, a small batch of epoxy with 10 wt % PVCi loading was made to ensure a proper signal strength in the FTIR. Spectra were taken with no UV irradiation at 0% strain, 4 h UV irradiation at 0% strain, and 4 h UV irradiation at 15% strain.

Figure 9:
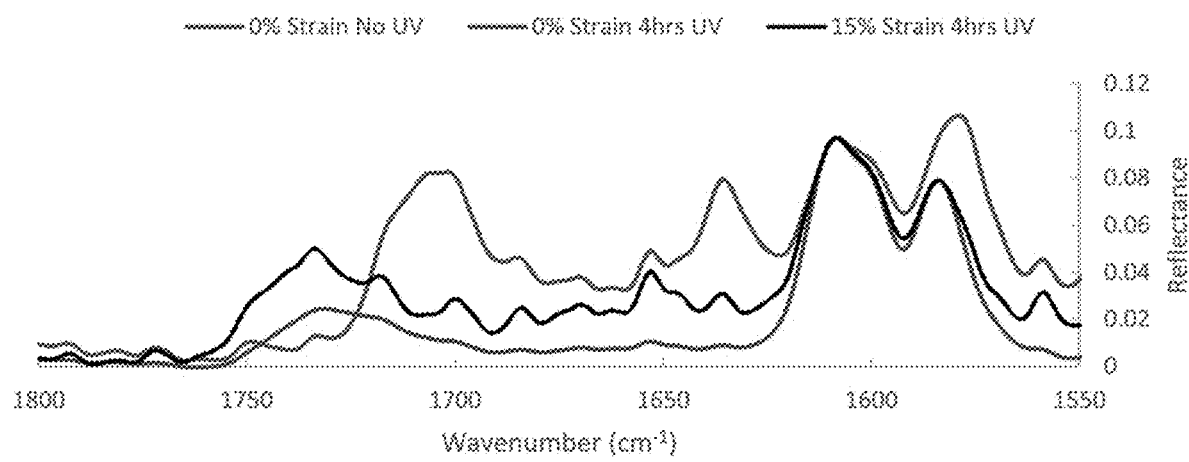
FIG. 9 shows the results of a scan of 10 wt % PVCi embedded epoxy, according to some embodiments.

FIG. 9 shows the results obtained from the above-taken spectra for a scan of 10 wt % PVCi embedded epoxy. Initial spectra before irradiation and no strain (blue) decreases with UV irradiation over 4 h (red). The intensity in the region from 1630 cm-1 to 1750 cm-1 returns after applying 15% strain to the sample (black). Samples with no UV irradiation and no strain show an evident peak at approximately 1635 $cm^{-1}$, corresponding to the UV active carbon-carbon double bond in PVCi. Peaks are also present at about 1710 $cm^{-1}$, corresponding to the carbon-oxygen double bond in PVCi. After irradiation, the carbon-carbon double bond peak at 1635 $cm^{-1}$ disappears, and the carbon-oxygen double bond peak at 1710 $cm^{-1}$ shifts to 1732 $cm^{-1}$ due to the change in conjugation. After 15% strain, the UV active carbon-carbon double bond recovers about 28% expression from its initial peak, indicating the breaking of these bonds due to mechanical strain. It is important to note that the entire region between approximately 1730 $cm^{-1}$ and 1620 $cm^{-1}$ had a significantly higher reflectance before irradiation and after compression. This overall increase in reflectance could be used as an indication of signal detection. However, the peak at 1635 $cm^{-1}$ was selected as the point of analysis due to its correspondence to the mechanochemistry involved in the cinnamoyl moiety.

Figure 10A:
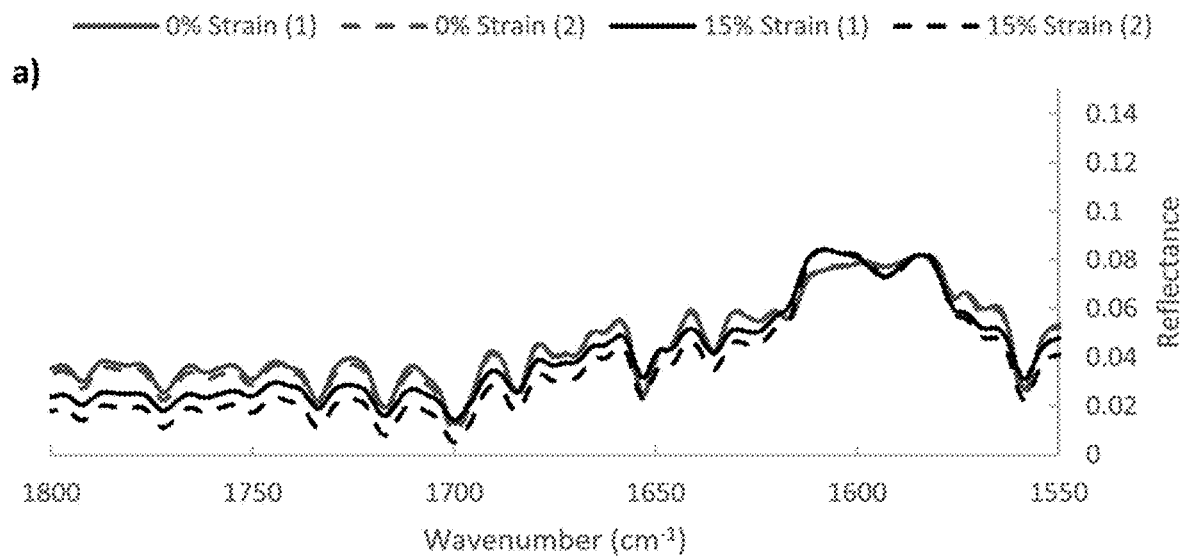
FIGS. 10A-10B show spectra results for a control sample of neat epoxy and spectra results for compression of 10% PVCi epoxy composite with no carbon nanotubes (CNT), according to some embodiments.
Figure 10B:
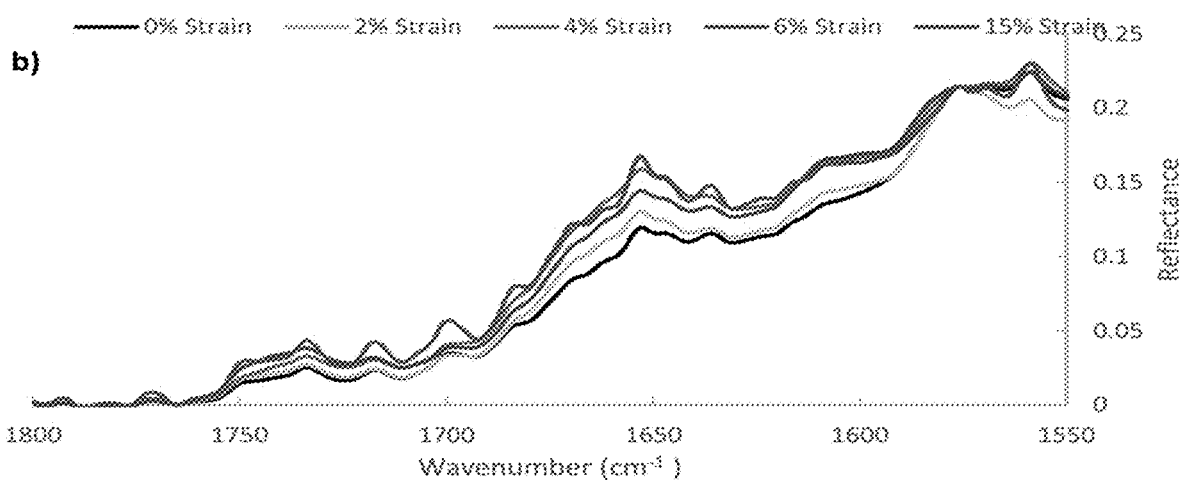

FIGS. 10A-10B show results of control neat epoxy spectra and spectra results for compression of 10% PVCi epoxy composite with no carbon nanotubes (CNT). FIG. 10A shows the normalized results obtained for spectra from control samples of neat epoxy with no mechanophores that were run under 0% and 15% strain to ensure that a change in spectra at 1635 $cm^{-1}$ and 1710 $cm^{-1}$ were not intrinsic to mechanical loads applied to the epoxy network. All samples showed change within standard deviation for before and after compression, indicating there was no change due to mechanical loads. Thus, there was no statistical difference between spectra at 0% strain and 15% strain throughout the 1630 $cm^{-1}$-1750 $cm^{-1}$ region. FIG. 10B includes results for compression of 10% PVCi epoxy composite with no carbon nanotubes (CNT), normalized to a peak at 1575 $cm^{-1}$ (aromatic C=C). The results in FIG. 10B show an entire region increase, with compression, which is focused on 1635 $cm^{-1}$. There is an observable trend with a general increase in intensity throughout the 1630 $cm^{-1}$ to 1750 $cm^{-1}$ region.

Much like in the preliminary experiment, epoxy samples containing 10 wt % PVCi were prepared without any loading of CNTs. Because these samples did not contain CNTs, they were translucent and therefore comparable to previous work using transparent samples with fluorescent imaging. Before the samples were compressed, a spectrum was taken of each sample designated for each compression in order to provide a baseline and develop a distribution of the natural deviation between samples. For each sample, once compressed to its designated strain, a spectrum was then immediately taken and compared to the corresponding unstrained spectra. Two spectra were taken per sample, with two samples per strain. Between two batches, a total of eight replicates per data point were taken to provide a definitive distribution. FIG. 10B shows an overlay of scans from one batch. Lower strains tend to show a lower relative peak height compared to those of higher strain, with the general trend of increasing peak height with increasing strain.

Figure 11:
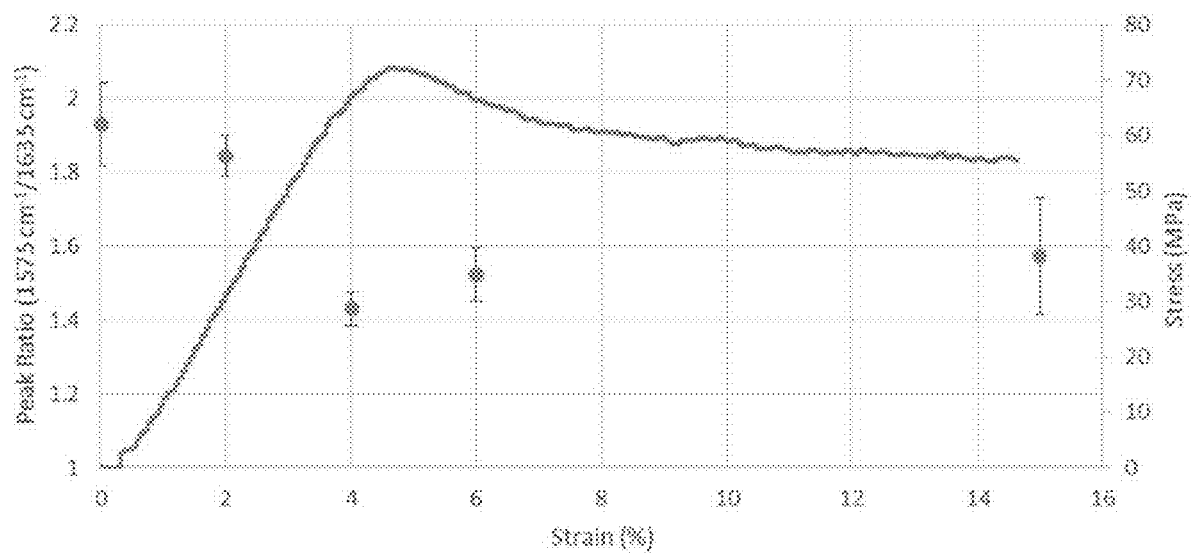
FIG. 11 illustrates a stress-strain curve for 10% PVCi composite (solid line) and a plot of peak ratio between 1575 $cm^{-1}$ and 1635 $cm^{-1}$ with an increasing strain of the same sample (circles), according to some embodiments.

FIG. 11 shows a stress-strain curve for 10% PVCi composite (solid line) and a plot of peak ratios between 1575 cm-1 and 1635 cm-1 with an increasing strain of the same sample (circles). There is a statistical difference in the peak ratios at 4% strain, before the yield point of the material. The ratio of peak intensity of 1575 $cm^{-1}$ (aromatic reference peak) to 1635 $cm^{-1}$ (trans-isomer of photoactive double-bond) was taken to show the change with increasing strain as well as the standard deviation for each data point. As evident from this graph, there is a clear decreasing trend with respect to the ratio of 1575 $cm^{-1}$ to 1635 $cm^{-1}$ with the statistical difference occurring at 4% strain. Since the 1575 $cm^{-1}$ peak is considered a constant peak as proven by the neat epoxy control sample, the decrease in peak ratio indicates that the peak at 1635 $cm^{-1}$ is increasing. This is significant when compared to previous art using cinnamoyl moieties. Being capable of sensing at 4% is an improvement over previous TCE results, which were only capable of sensing at 6% strain, just after the yield point of the epoxy sample.

However, after 4% strain, all higher strains were not statistically different from each other. This may suggest that the mechanophore activation for this sample does not increase with an increasing strain like previous art suggests. Instead, it suggests that a more straightforward, binary activation occurs for the embedded network at a certain load. Due to the small detection surface that the FTIR examines, it can be hypothesized that once enough force is applied to the examined surface, the mechanophores in this region are fully activated and displays a binary response. Previous work utilized fluorescence imaging, which examines the entire sample surface. Since the load applied at an individual point in the surface of the material varies, mechanophore activation will vary slightly across the entire surface. As the net force applied across the material increases, this "average" activation increases linearly with respect to the overall force.

Similar to the standard 10 wt % PVCi epoxy samples disclosed previously, additional samples were made with 0.5 wt % CNT. CNTs are sometimes used to improve mechanical properties by reinforcing the thermoset. However, for this experiment, they are used merely to create a completely opaque sample using a common structural additive. Since these samples cannot be measured using standard UV fluorescent imaging, ATR-FTIR spectra were employed to utilize the peak height at 1635 $cm^{-1}$ in order to detect signal before the yield point of the sample. Similarly to the previous samples, two spectra were taken for each sample, with a total of two samples for each strain. Spectra were taken before and after strain for each sample.

Figure 12:
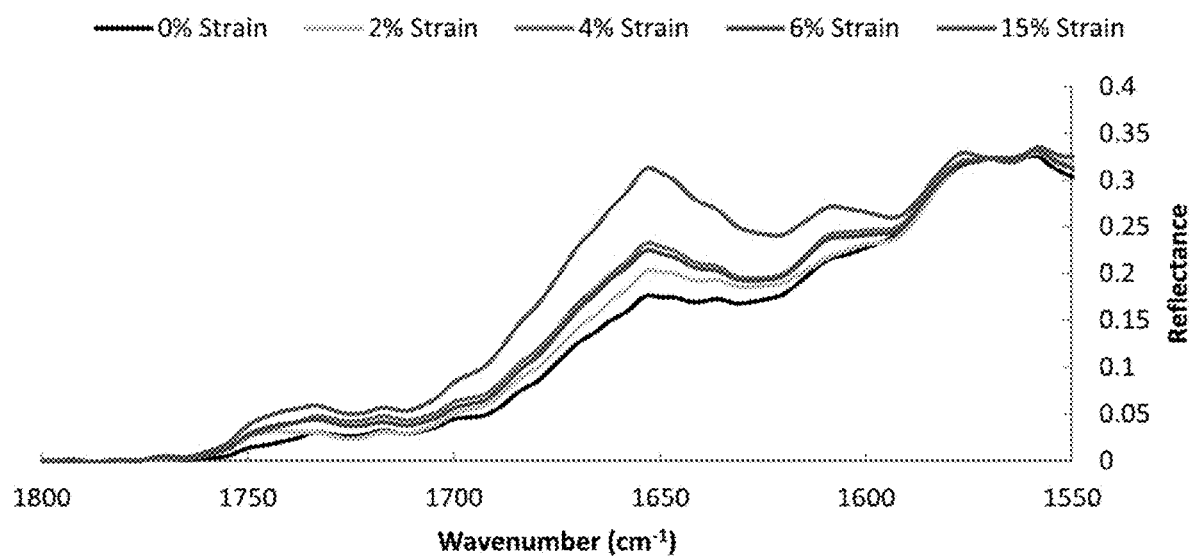
FIG. 12 illustrates spectra results for compression of 10% PVCi epoxy composite with 0.5% CNT, normalized to a peak at 1575 $cm^{-1}$ (aromatic C=C), according to some embodiments.

FIG. 12 illustrates spectra results for compression of 10% PVCi epoxy composite with 0.5% CNT, normalized to peak at 1575 cm-1 (aromatic C=C). An entire region of increase occurs with compression, which is focused on 1635 cm-1. There is an observable trend with a general increase in intensity throughout the 1630 cm-1 to 1750 cm-1 region. FIG. 12 shows a plot of these spectra. Much like the standard 10 wt % PVCi samples, a clear trend with increasing peak height at 1635 $cm^{-1}$ is observed with respect to increasing strain.

Figure 13:
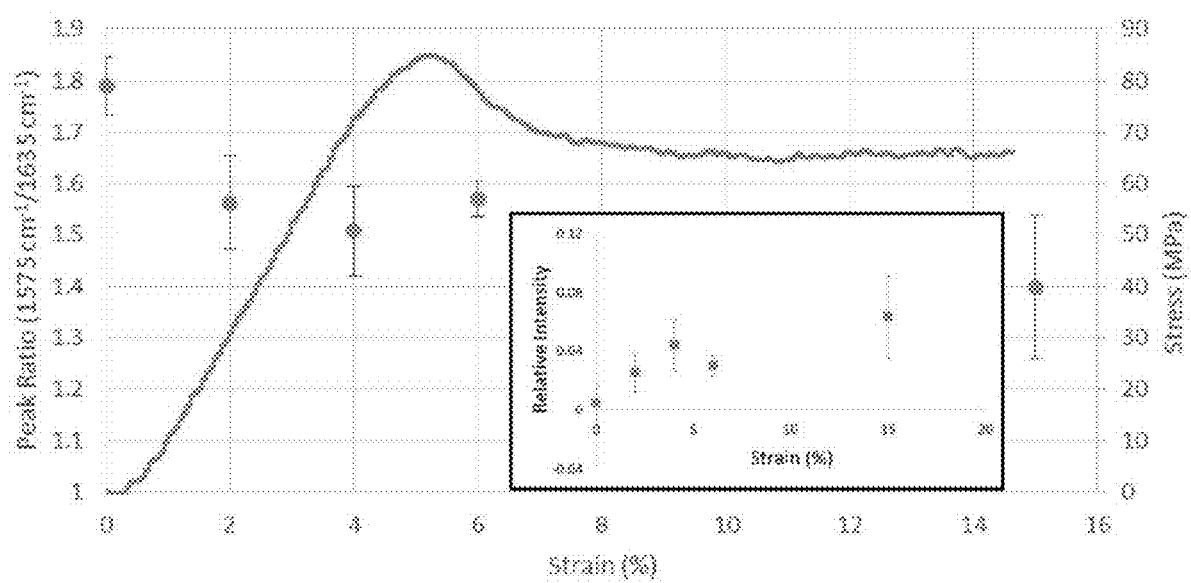
FIG. 13 shows a stress-strain curve for 10% PVCi composite with 0.5% CNT (solid line), a plot of peak ratio between 1575 $cm^{-1}$ and 1635 $cm^{-1}$ (circles), and a plot of relative intensity difference in peak height at 1635 $cm^{-1}$ from before and after strain was applied (inset), according to some embodiments.

FIG. 13 shows a plot of the FIG. 12 data with respect to the stress-strain curve, while the inset of FIG. 13 illustrates the difference in peak height between the strained sample and the initial unstrained scan of the same sample. Referring to FIG. 13, a stress-strain curve for 10% PVCi composite with 0.5% CNT is represented by the solid line. A plot of peak ratios between 1575 cm-1 and 1635 cm-1, with increasing strain for the same sample, is represented by the circles. There is a statistical difference in the peak ratios at 2% strain, before the yield point of the material. The inset illustrates a plot of relative intensity difference in peak height at 1635 cm-1 from before and after strain was applied. The difference was taken from a single sample that was scanned before strain and immediately after strain.

A second scan of the initial unstrained sample was taken to observe any natural deviations in peak height. By comparing the compressed samples to their uncompressed counterparts, there is a clear statistical difference once again at 4% strain. These results reinforce the previous work with standard 10 wt % PVCi samples, a marked improvement over previous work with Di-AC and TCE.

FIG. 14 illustrates an attenuated total reflectance-Fourier transform infrared spectroscopy (ATR-FTIR) system for measuring molecular structure changes in samples incorporated with mechanophores, according to some embodiments. The ATR-FTIR system comprises an attenuated total reflection (ATR) module and a Fourier transform infrared (FTIR) module. The ATR module measures the changes that occur in an internally reflected IR beam when the beam comes into contact with the mechanophore embedded composite sample. An IR beam from the FTIR module is directed onto an optically dense crystal with a high refractive index at a certain angle. This internal reflectance creates an evanescent wave that extends beyond the surface of the crystal into the mechanophore embedded composite sample held in contact with the crystal. In regions of the IR spectrum where the sample absorbs energy, the evanescent wave will be attenuated. The attenuated beam returns to the crystal, then exits the opposite end of the crystal and is directed to the detector in the IR spectrometer. The detector records the attenuated IR beam as an interferogram signal, which can then be used to generate an IR spectrum using the Fourier transform (FT) method. In some embodiments, the IR spectrum may be output from the ATR-FTIR system and transmitted to a computer system to be plotted and displayed to a screen or printed, for example. This IR spectrum can be used to analyze/characterize the molecular structure of the mechanophore embedded composite sample. Through the spectrum analysis, the molecular structure changes may be determined. For example, initiation of damage or progression of damage in the sample may be determined, or a healthy sample vs. a damaged sample may be identified.

In summary, the sensing of an opaque, black sample was successfully achieved using ATR-FTIR. Previous work with UV-fluorescence imaging was incapable of measuring a sample with either property. Moreover, the previous particulate mechanophores were sensed at just before the yield point of the epoxy material at approximately 6% strain. Sensing before 6% strain has not previously been disclosed using cinnamate groups as active mechanophores within an epoxy thermoset.

Methods and systems are provided for real-time damage detection using mechanophores. Self-sensing mechanophore embedded fiber reinforced composites are employed. The detection system may include an ultra-violet (UV) camera, UV lamp, a band-pass filter, and load-frame. The system may capture damage initiation before material yield and track damage progression in composites subject to mechanical loading. Activated mechanophores embedded in the composite indicate the presence of damage in real-time in the form of UV fluorescence that can be captured using the UV camera. The load-frame is used to apply mechanical loads to mechanophore embedded composites. When damage is initiated, and the activated mechanophore is exposed to UV light, the UV excited fluorescence is captured using the UV camera. Mechanophore fluorescence spectra may also be detected using attenuated total reflectance-Fourier transform infrared spectroscopy (ATR-FTIR).

Some methods and materials are described below, although, methods and materials that are similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The present disclosure also contemplates other embodiments "comprising", "consisting of", and "consisting essentially of", the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example, "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Various features and advantages of the disclosure are set forth in the following claims.

What is claimed is:

1. A method for detecting mechanophore damage in a composite material, the method comprising:
   embedding mechanophores in a fiber reinforced composite material, wherein the mechanophores are embedded in a matrix of the fiber reinforced composite material;
   applying a mechanical load to the mechanophore embedded fiber reinforced composite material with a load frame; and
   detecting a damage precursor signal that is generated as a result of the application of the mechanical load to the mechanophore embedded fiber reinforced composite material, wherein the damage precursor signal is detected before yield of the mechanophore embedded fiber reinforced composite material, including detecting spectra from an evanescent wave distorted by the mechanophore embedded composite material using attenuated total reflectance-Fourier transform infrared spectroscopy (ATR-FTIR).

2. The method of claim 1, wherein the mechanophores comprise dimerized monomer particles.

3. The method of claim 1, wherein detecting a damage precursor signal that is generated as a result of the application of the mechanical load to the mechanophore embedded fiber reinforced composite material includes:

illuminating the mechanophore embedded fiber reinforced composite material with UV light to excite the mechanophores that are embedded in the fiber reinforced composite material; and capturing fluorescent emissions of the UV light excited mechanophores embedded in the fiber reinforced composite material with a UV camera and filtering light received at the UV camera based on an emission wavelength of the mechanophores.

4. The method of claim 3, wherein the emissions of the excited mechanophores are captured continuously as the applied mechanical load is varied.

5. The method of claim 1, wherein the composite material is a fiber reinforced composite material.

6. The method of claim 5, wherein the mechanophore embedded fiber reinforced composite material is an opaque material.

7. The method of claim 1, wherein the damage precursor signal is detected without the need for fluorescence of the embedded mechanophores.

8. The method of claim 1, wherein the mechanophores include dimerized anthracene carboxylic acid (Di-AC), tris (cinnamoyloxymethyl) ethane (TCE), or Poly(vinyl cinnamate) (PVCi).

9. A system for detecting mechanophore damage in a composite material, the system comprising:

a mechanophore embedded fiber reinforced composite material, wherein mechanophores are embedded in a matrix of the composite material;

a load frame that is configured to apply a mechanical load to the mechanophore embedded fiber reinforced composite material; and a light detecting device that is configured to detect a damage precursor signal that is generated as a result of the application of the mechanical load to the mechanophore embedded fiber reinforced composite material, wherein the damage precursor signal is detected before yield of the mechanophore embedded fiber reinforced composite material, wherein the light detecting device is an attenuated total reflectance-Fourier transform infrared spectroscopy (ATR-FTIR) system, and detecting a damage precursor signal that is generated as a result of the application of the mechanical load to the mechanophore embedded fiber reinforced composite material includes:

detecting spectra from an evanescent wave distorted by the mechanophore embedded composite material using the ATR-FTIR system.

10. The system of claim 9, wherein the mechanophore embedded fiber reinforced composite material is an opaque material.

11. The system of claim 9, wherein the damage precursor signal is detected without the need for fluorescence of the embedded mechanophores.

12. The system of claim 9, wherein the mechanophores include dimerized anthracene carboxylic acid (Di-AC), tris (cinnamoyloxymethyl) ethane (TCE), or Poly(vinyl cinnamate) (PVCi).

* * * * *